(12) United States Patent
Zhang et al.

(10) Patent No.: US 10,700,368 B2
(45) Date of Patent: Jun. 30, 2020

(54) HIGH-TEMPERATURE OPERATION FUEL CELL SYSTEM

(71) Applicant: Panasonic Intellectual Property Management Co., Ltd., Osaka (JP)

(72) Inventors: Jin Zhang, Osaka (JP); Shigenori Onuma, Kyoto (JP); Takashi Kakuwa, Osaka (JP); Masashi Morita, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 191 days.

(21) Appl. No.: 15/944,426

(22) Filed: Apr. 3, 2018

(65) Prior Publication Data

US 2018/0309145 A1    Oct. 25, 2018

(30) Foreign Application Priority Data

Apr. 21, 2017   (JP) .................................. 2017-084406

(51) Int. Cl.
*H01M 8/04225*    (2016.01)
*H01M 8/04828*    (2016.01)
(Continued)

(52) U.S. Cl.
CPC ... *H01M 8/04225* (2016.02); *H01M 8/04022* (2013.01); *H01M 8/04067* (2013.01); *H01M 8/0494* (2013.01); *H01M 8/04291* (2013.01); *H01M 8/04302* (2016.02); *H01M 8/04373* (2013.01); *H01M 8/04738* (2013.01);
(Continued)

(58) Field of Classification Search
CPC ......... H01M 8/04022; H01M 8/04067; H01M 8/04225; H01M 8/04291; H01M 8/04373; H01M 8/04738; H01M 8/04753; H01M 8/04776; H01M 8/0494; H01M 8/0618; H01M 8/12; H01M 8/2425; H01M 8/04302
See application file for complete search history.

(56) References Cited

U.S. PATENT DOCUMENTS

2016/0293981 A1* 10/2016 Sakai .................. H01M 8/2457

FOREIGN PATENT DOCUMENTS

JP        2015-185263        10/2015
WO    WO-2015162833 A1 * 10/2015

* cited by examiner

*Primary Examiner* — Carlos Barcena
(74) *Attorney, Agent, or Firm* — McDermott Will & Emery LLP

(57) ABSTRACT

A high-temperature operation fuel cell system includes a cell stack; a reformer; a raw material supplier supplying a raw material to the reformer; a water supplier supplying reforming water; an air supplier supplying electric power generation air; a combustion chamber in which an off-gas from the cell stack is combusted and which heats the cell stack and the reformer; an igniter igniting the off-gas in the combustion chamber; and a controller. In a start-up sequence, the controller controls so that the raw material is supplied to the reformer, the electric power generation air is supplied to the cell stack, the off-gas is ignited by the igniter, and after the ignition, the supply of the reforming water is started, and after the supply of the reforming water is started, the controller further controls the air supplier to increase the flow rate of the electric power generation air in a stepwise manner.

4 Claims, 8 Drawing Sheets

(51) Int. Cl.
*H01M 8/2425* (2016.01)
*H01M 8/04701* (2016.01)
*H01M 8/04291* (2016.01)
*H01M 8/12* (2016.01)
*H01M 8/04302* (2016.01)
*H01M 8/04746* (2016.01)
*H01M 8/0612* (2016.01)
*H01M 8/04014* (2016.01)
*H01M 8/0432* (2016.01)
*H01M 8/04007* (2016.01)

(52) U.S. Cl.
CPC ... *H01M 8/04753* (2013.01); *H01M 8/04776* (2013.01); *H01M 8/0618* (2013.01); *H01M 8/12* (2013.01); *H01M 8/2425* (2013.01)

HIGH-TEMPERATURE OPERATION FUEL CELL SYSTEM

BACKGROUND

1. Technical Field

The present disclosure relates to a high-temperature operation fuel cell system and, in particular, relates to a supply control of electric power generation air in a start-up sequence of a high-temperature operation fuel cell system.

2. Description of the Related Art

As one example of a high-temperature operation fuel cell, for example, a solid oxide fuel cell (hereinafter, referred to as "SOFC") may be mentioned. The SOFC has the structure in which an oxide ion conductive solid electrolyte is used as an electrolyte, and electrodes are provided at two sides thereof. In this SOFC, a reformed gas obtained by reforming a raw material, such as a town gas (13A), is supplied to one electrode side, and an oxidant gas, such as air, is supplied to the other electrode side. In addition, the SOFC generates an electric power by an electrochemical reaction between hydrogen in the reformed gas and oxygen in the oxidant gas, each gas being supplied as described above. In the SOFC, water is generated by a chemical reaction between hydrogen and oxide ions passing through the oxide ion conductive solid electrolyte, and carbon dioxide is generated by a chemical reaction between oxide ions and carbon monoxide, so that the electric power and heat are generated. The electric power thus generated is extracted out of the SOFC and is supplied to various electric power loads. In addition, heat generated during power generation is used for heating of a raw material, electric power generation air, reforming water, and the like. In addition, as a method for heating a reformer, an off-gas combustion cell burner method has been proposed (for example, see Japanese Unexamined Patent Application Publication No. 2015-185263). An SOFC system disclosed in Japanese Unexamined Patent Application Publication No. 2015-185263 uses a method in which an off-gas flowing out of an upper end portion of a fuel cell unit is ignited by an ignition device, and a reformer is heated by combustion of the off-gas.

SUMMARY

One non-limiting and exemplary embodiment provides a high-temperature operation fuel cell system capable of preventing overheating of a reformer and a cell stack in a start-up sequence.

In one general aspect, the techniques disclosed here feature a high-temperature operation fuel cell system comprising: a cell stack for generating an electric power by a reaction between a fuel gas and electric power generation air; a reformer for generating the fuel gas by reforming a raw material and for supplying the fuel gas to the cell stack; a raw material supplier for supplying the raw material to the reformer; a water supplier for supplying reforming water to the reformer; an air supplier for supplying the electric power generation air to the cell stack; a combustion chamber in which an off-gas discharged from the cell stack is combusted and which heats the cell stack and the reformer by heat generated in association with the combustion; an igniter for igniting the off-gas in the combustion chamber; and a controller. In this high-temperature operation fuel cell system, the controller controls in a start-up sequence the high-temperature operation fuel cell system such that the raw material supplier supplies the raw material to the reformer; the air supplier supplies the electric power generation air to the cell stack; the igniter ignites the off-gas discharged from the cell stack; and after the ignition, the water supplier starts the supply of the reforming water to the reformer, and after the supply of the reforming water is started by the water supplier, the controller further controls the air supplier to increase a flow rate of the electric power generation air in a stepwise manner.

The present disclosure is formed as described above and has an effect of preventing overheating of the reformer and the cell stack in the start-up sequence.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
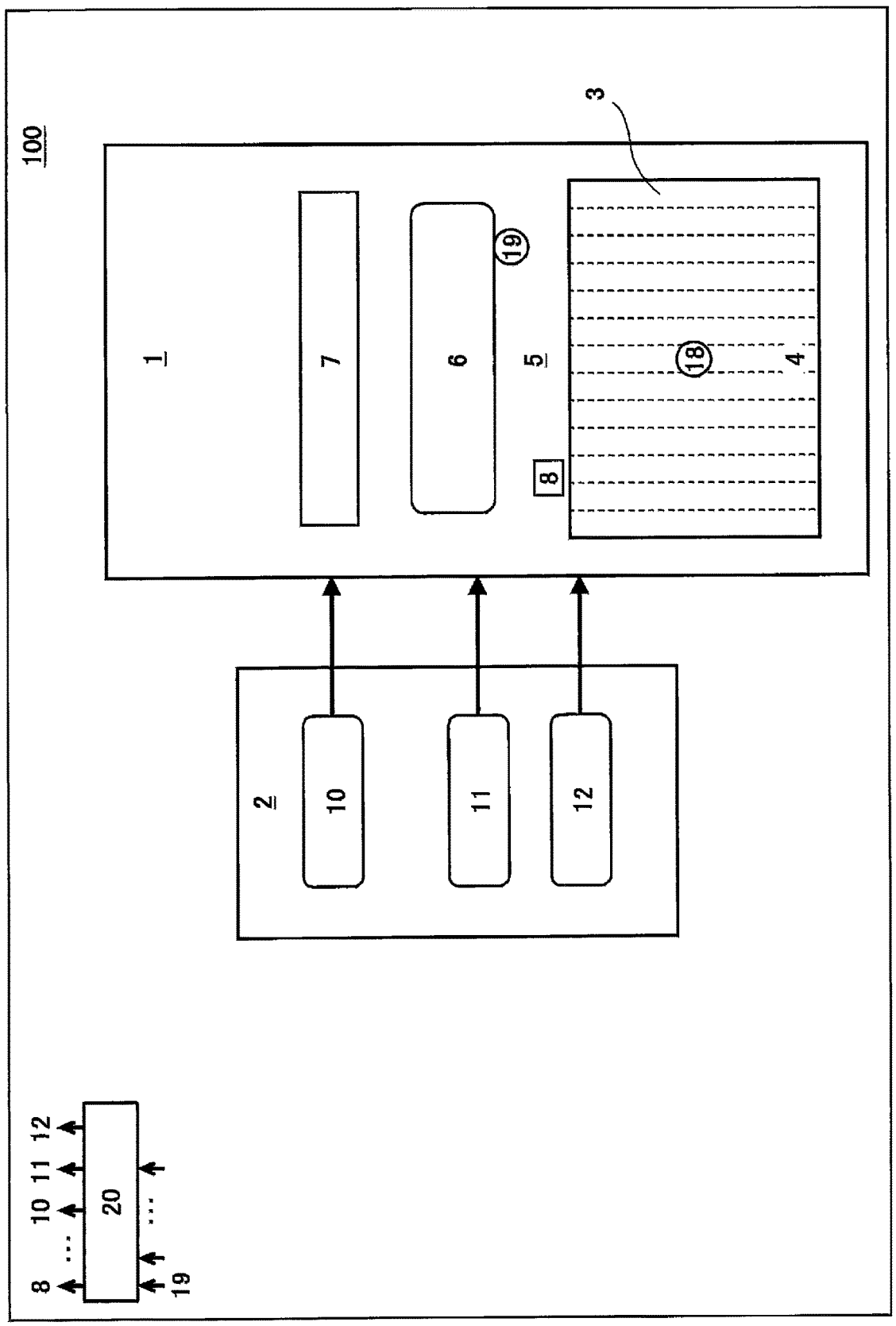
FIG. 1 is a schematic view showing the entire structure of an SOFC system according to an embodiment of the present disclosure.

Underlying Knowledge Forming Basis of the Present Disclosure

In a reformer of an SOFC system, as a reforming reaction generating a reformed gas from a raw material, for example, there may be mentioned at least one of a partial oxidation reforming reaction (PDX), a steam reforming reaction (SR), and an autothermal reforming reaction (ATR) in which the above two reactions are carried out in combination. PDX is an exothermic reaction generating a reformed gas (hydrogen-containing gas) by a reaction between a raw material and oxygen. On the other hand, SR is an endothermic reaction generating a reformed gas by a reaction between a raw material and steam.

Intensive research was carried out by the present inventors on the SOFC system described in Japanese Unexamined Patent Application Publication No. 2015-185263. In particular, the SOFC system described above has the structure in which in a start-up sequence, after an off-gas flowing out of an upper end portion of a cell is ignited by an ignition device, by combustion of this off-gas, heating of a reformer and an evaporator is controlled. In the above structure described in Japanese Unexamined Patent Application Publication No. 2015-185263, before the off-gas is ignited, a water supply to the evaporator is started. As described above, since the water supply to the evaporator is started before the off-gas is ignited, even if the temperature of the reformer is increased by the combustion of the off-gas, steam reforming tends to be induced in this reformer, and as a result, unreformed carbon can be suppressed from being generated. In addition, even if unreformed carbon is generated, by a reaction with steam, the unreformed carbon is changed into carbon monoxide or carbon dioxide and can be removed. Accordingly, in the SOFC system described in Japanese Unexamined Patent Application Publication No. 2015-185263, the structure is formed so that precipitated carbon is prevented from being accumulated in the cell.

However, the present inventors found that in the SOFC system described in Japanese Unexamined Patent Application Publication No. 2015-185263, the following problem arises.

First, according to the SOFC system described in Japanese Unexamined Patent Application Publication No. 2015-185263, in the start-up sequence, a combustion step is controlled so that electric power generation air and reforming water are each supplied at a constant flow rate. Subsequently, when the combustion step is transferred to a first steam reforming reaction step (SR1), while the flow rate of the electric power generation air is maintained constant, the flow rate of the reforming water is increased. Next, when a detection temperature detected by a reformer temperature sensor reaches approximately 450° C., the first steam reforming reaction step (SR1) is transferred to a second steam reforming reaction step (SR2). In this case, at an initial stage of the second steam reforming reaction step (SR2), control is performed so that the flow rate of the electric power generation air is decreased, and at the same time, the flow rate of the reforming water is increased.

In addition, at the start of the second steam reforming reaction step (SR2), since the reforming reaction has proceeded, and a large amount of the reformed gas is generated, the combustion heat quantity of the off-gas is believed to be increased. It was found that in the state as described above, when the flow rate of the electric power generation air is decreased, members to be heated, such as a cell stack and the reformer, may be overheated in some cases.

Accordingly, through intensive research carried out on a start-up sequence in a high-temperature operation fuel cell system, such as an SOFC system, the present inventors found that when the flow rate of the electric power generation air is increased in a stepwise manner in a steam reforming reaction step (SR), overheating of the members to be heated can be prevented, and as a result, the present disclosure was made.

The knowledge of the present inventors described above has not been disclosed in the past and includes novel technical characteristics which can obtain a significant operational effect. Hence, in particular, the present disclosure provides the following aspects.

A high-temperature operation fuel cell system according to a first aspect of the present disclosure comprises: a cell stack for generating an electric power by a reaction between a fuel gas and electric power generation air; a reformer for generating the fuel gas by reforming a raw material and for supplying the fuel gas to the cell stack; a raw material supplier for supplying the raw material to the reformer; a water supplier for supplying reforming water to the reformer; an air supplier for supplying the electric power generation air to the cell stack; a combustion chamber in which an off-gas discharged from the cell stack is combusted and which heats the cell stack and the reformer by heat generated in association with the combustion; an igniter for igniting the off-gas in the combustion chamber; and a controller. The controller controls in a start-up sequence the high-temperature operation fuel cell system such that the raw material supplier supplies the raw material to the reformer, the air supplier supplies the electric power generation air to the cell stack, the igniter ignites the off-gas discharged from the cell stack, and after the ignition, the water supplier starts the supply of the reforming water to the reformer, and after the supply of the reforming water is started by the water supplier, the controller further controls the air supplier to increase a flow rate of the electric power generation air in a stepwise manner.

When the supply of the reforming water is started in the start-up sequence described above, a steam reforming reaction is started in the reformer, and hydrogen is generated. Accordingly, since the amount of hydrogen in the composition of the off-gas discharged to the combustion chamber is increased, and combustion characteristics of the off-gas in the combustion chamber are improved, the cell stack and the reformer may be overheated in some cases. Incidentally, the reforming water is water to be used in a reforming reaction performed in the reformer.

However, in the structure described above, after the supply of the reforming water is started, since the controller controls so that the air supplier increases the flow rate of the electric power generation air in a stepwise manner, the combustion temperature in the combustion chamber is decreased, and as a result, the reformer and the cell stack are prevented from being overheated.

Hence, an effect of preventing the overheating of the reformer and the cell stack in the start-up sequence can be obtained.

In a high-temperature operation fuel cell system according to a second aspect of the present disclosure, when the reformer reaches a predetermined temperature after the off-gas is ignited, the controller in the first aspect described above may control the water supplier to start the supply of the reforming water to the reformer.

In the case described above, the predetermined temperature indicates a temperature at which the reforming water is evaporated.

According to the structure described above, since the supply of the reforming water to the reformer is started when the reformer reaches the predetermined temperature, the reforming of the raw material can be performed in the reformer by the steam reforming reaction (SR) which is an endothermic reaction. Hence, the risk in that the reformer is overheated can be reduced.

In a high-temperature operation fuel cell system according to a third aspect of the present disclosure, the controller in the second aspect described above may control the flow rate of the electric power generation air by the air supplier and the flow rate of the raw material by the raw material supplier at the start of the supply of the reforming water by the water supplier so that an air excess ratio of the air relating to the combustion in the combustion chamber is 1.0 to 2.0.

According to the structure described above, since the air excess ratio of the air relating to the combustion at the start of the supply of the reforming water is 1.0 to 2.0, air at a flow rate slightly larger than that at the equivalent ratio can be supplied to the combustion chamber. Hence, incomplete combustion can be prevented in the combustion chamber, and the combustion can be facilitated.

In a high-temperature operation fuel cell system according to a fourth aspect of the present disclosure, the controller in the first aspect described above may control the air supplier to increase the flow rate of the electric power generation when a temperature of the reformer reaches predetermined temperatures.

The following embodiment of the present disclosure will be described with reference to the drawings. In addition, hereinafter, in all the drawings, identical or corresponding constituent members are designated by the same reference numeral, and description thereof may be omitted in some cases.

In addition, in the embodiment of the present disclosure, as the high-temperature operation fuel cell system, although an SOFC system including a solid oxide fuel cell (SOFC) at a power generation portion will be described by way of example, the high-temperature operation fuel cell system is not limited thereto. For example, the high-temperature operation fuel cell system may also be an MCFC system including a molten carbonate fuel cell (MCFC) at a power generation portion or the like and may be a fuel cell system capable of effectively using high temperature exhaust heat.

Embodiment (Structure of SOFC System)

FIG. 1 is a schematic view showing the entire structure of an SOFC system 100 according to an embodiment of the present disclosure. In addition, for convenience of illustration, in FIG. 1, distribution paths of a raw material, a reformed gas (fuel gas), reforming water (water used for reforming), and electric power generation air in a fuel cell module 1 are omitted.

As shown in FIG. 1, the SOFC system 100 includes the fuel cell module 1, a sub-device 2, and a controller 20.

The fuel cell module 1 includes cells 3, a cell stack 4, a combustion chamber 5, a reformer 6, an air pre-heating device 7, an igniter 8, a stack temperature detection sensor 18, and a reformer temperature detection sensor 19.

The fuel cell module 1 includes the cell stack 4 in which the cells 3 are electrically connected in series. The cells 3 are each formed so that an air electrode (cathode) and a fuel electrode (anode) are provided at two sides of an electrolyte layer, and so that the electric power generation air as an oxidant gas and the reformed gas as the fuel gas are supplied to an air electrode side and a fuel electrode side, respectively. In addition, the reformed gas and the electric power generation air supplied to the fuel electrode and the air electrode, respectively, are each jetted out of an outlet formed at an upper end portion of each cell 3 as an off-gas and are then introduced into the combustion chamber 5. In addition, for example, the cell 3 may be either a cylindrical cell or a flat plate cell. In addition, the cell 3 may be a cylindrical flat plate cell.

At an upper portion of the cell stack 4, the combustion chamber 5 is provided, and in the combustion chamber 5, the igniter 8 which ignites the off-gas discharged from the cell stack 4 for combustion is provided. The igniter 8 may be, for example, either an ignition device or an ignition heater. The combustion chamber 5 has a space in which an anode off-gas discharged from the anode of the cell forming the cell stack 4 and a cathode off-gas discharged from the cathode thereof are combusted. In this specification, the anode off-gas and the cathode off-gas are collectively called the off-gas. In addition, at start-up of the SOFC system 100, when the reforming reaction is not advanced in the reformer 6, the raw material and the electric power generation air are fed to the combustion chamber 5 without being substantially changed. Subsequently, as the reforming reaction is advanced in the reformer 6, and the reformed gas is generated by reforming of the raw material, the off-gas has a composition containing a large amount of hydrogen.

At an upper portion of the combustion chamber 5, the reformer 6 which reforms the raw material supplied to the fuel cell module 1 by the sub-device 2 and which generates the reformed gas is provided.

Furthermore, at an upper portion of the reformer 6, the air pre-heating device 7 pre-heating the electric power generation air supplied by the sub-device 2 is provided. The reformer 6 and the air pre-heating device 7 are arranged so as to be heated by combustion heat in the combustion chamber 5 and heat of a combustion exhaust gas generated by the combustion of the off-gas. In addition, since heating the reformer 6 and the air pre-heating device 7, the combustion exhaust gas partially loses its heat and is then exhausted outside through an exhaust gas outlet (not shown) of the fuel cell module 1.

The reformer 6 generates the reformed gas (hydrogen-containing gas) by a reforming reaction using the raw material and a reaction gas other than the raw material. Various reforming reactions may be arbitrarily used, and for example, a steam reforming reaction (SR), an autothermal reaction (ATR), and a partial oxidation reaction (PDX) may be mentioned. In addition, although the SOFC system 100 according to the embodiment has the structure in which SR is only performed in a start-up sequence, as is an SOFC system 101 according to the following Modified Examples 1 and 2, the structure may be formed so that PDX and ATR are also performed.

The raw material includes an organic compound containing at least carbon and hydrogen as constituent elements. As the raw material, in particular, for example, there may be mentioned a gas, such as a town gas, a natural gas, each of which contains methane as a primary component, or LPG; or an alcohol, such as methanol. The raw material is supplied from a raw material supply source, and, for example, a gas cylinder or gas infrastructure may be mentioned as this raw material supply source.

In addition, as the reaction gas other than the raw material, when the reforming reaction is a steam reforming reaction, steam (reforming water) may be mentioned; when the reforming reaction is an autothermal reaction, steam and air may be mentioned; and when the reforming reaction is a partial oxidation reaction, air may be mentioned. In addition, the reformer 6 includes a reforming catalyst which promotes the reforming reaction. In the reforming catalyst, as a catalyst metal, for example, Ru and/or Ni may be used.

The sub-device 2 is formed to include a raw material supplier 10, an electric power generation air supplier (air supplier) 11, and a water supplier 12.

The raw material supplier 10 is a supplier to supply the raw material to the reformer 6 of the fuel cell module 1 in accordance with a control instruction from the controller 20 and may have the structure in which the flow rate of the raw material to be supplied to the reformer 6 can be adjusted. For example, the raw material supplier 10 may have the structure in which a pressure rise device and a flow rate adjusting valve are provided or may have the structure in which one of them is provided. As the pressure rise device, for example, although a constant volume type pump to be driven by a motor is used, the pressure rise device is not limited thereto.

The electric power generation air supplier 11 is a supplier to supply the electric power generation air to the cathode of the cell stack 4 of the fuel cell module 1 in accordance with a control instruction from the controller 20 and may have the structure in which the flow rate of the electric power generation air to be supplied to the cathode of the cell stack 4 can be adjusted. For example, the electric power generation air supplier 11 may have the structure in which a pressure rise device and a flow rate adjusting valve are provided or may have the structure in which one of them is provided. As the pressure rise device, for example, although a constant volume type pump to be driven by a motor is used, the pressure rise device is not limited thereto.

The water supplier 12 is a supplier to supply to the reformer 6, reforming water, which is water, to be used for the reforming reaction performed in the reformer 6 in accordance with a control instruction from the controller 20 and may have the structure in which the flow rate of the reforming water to be supplied to the reformer 6 can be adjusted. In addition, the water supplier 12 may have the structure in which a pressure rise device and a flow rate adjusting valve are provided or may have the structure in which one of them is provided. As the pressure rise device, for example, although a constant volume type pump to be driven by a motor is used, the pressure rise device is not limited thereto.

In addition, the SOFC system 100 also includes the stack temperature detection sensor 18 detecting the temperature of the cell stack 4 and the reformer temperature detection sensor 19 detecting the temperature of the reformer 6. In addition, the reformer temperature detection sensor 19 is provided at a place at which the temperature of the reformer 6 is not only detected but also the temperature of the combustion chamber 5 is detected so as to detect the temperature of the reformer 6 and that of the combustion chamber 5. In addition, when the structure is formed so that a memory (not shown) of the controller 20 stores in advance table information showing the relationship between the temperature of the cell stack 4 and the temperature of the reformer 6, and the controller 20 is able to obtain the temperature of the reformer 6 from the temperature of the cell stack 4 with reference to this table information, the reformer temperature detection sensor 19 is not always required.

The controller 20 is a controller to perform various controls of the members of the SOFC system 100 and is not particularly limited as long as having functions to control the members of the SOFC system 100. The controller 20 can be realized, for example, by a microcontroller, an MPU, a programmable logic controller (PLC), and/or a logic circuit. In addition, the controller 20 may be formed of a single controller which performs an integrated control or may be formed of controllers which perform dispersion controls in cooperation with each other.

In addition, besides the devices described above, the SOFC system 100 may further appropriately include at least one device necessary for each reforming reaction. For example, when the steam reforming reaction (SR) is performed in the reformer 6, the structure in which a combustion device heating the reformer 6, an evaporator generating steam, and the like are further provided may be formed.

In the SOFC system 100 having the structure as described above, the power generation is performed as described below. First, in the SOFC system 100, the raw material and the electric power generation air are supplied to the fuel cell module 1. In particular, in accordance with the control instruction from the controller 20, the raw material supplier 10 supplies the raw material, such as a town gas (13A), to the fuel cell module 1. The raw material supplied to the fuel cell module 1 is reformed in the reformer 6 to generate the reformed gas. The reformed gas thus generated is supplied to the cells 3 and is then jetted to the combustion chamber 5 from the outlet at the upper end portion of each cell 3. In addition, in accordance with the control instruction from the controller 20, the electric power generation air supplier 11 supplies the electric power generation air to the fuel cell module 1. The electric power generation air supplied to the fuel cell module 1 is supplied to the cells 3 through the air pre-heating device 7. The electric power generation air supplied to the cells 3 is fed to the combustion chamber 5 from the upper end portion of each cell 3.

When the off-gas is fed from the cells 3 into the combustion chamber 5 as described above, the controller 20 drives the igniter 8 to ignite the off-gas. Accordingly, flames are each formed in the vicinity of the outlet of each cell 3, and combustion can be performed at a predetermined air-fuel ratio (ratio of an actual air amount to a theoretical air amount necessary when the raw material is completely combusted). After heating the members to be heated, such as the reformer 6 and the air pre-heating device 7, provided above the combustion chamber 5, the combustion exhaust gas generated in the combustion chamber 5 is discharged out of the fuel cell module 1. In addition, for explosive welding prevention, the igniter 8 may be driven before the off-gas is fed to the combustion chamber 5.

As described above, by the combustion heat in the combustion chamber 5 and the heat of the combustion exhaust gas, the cell stack 4, the reformer 6, the air pre-heating device 7, and the like are heated. In addition, the controller 20 is able to monitor the temperature of the reformer 6 from the detection result of the reformer temperature detection sensor 19.

(Operation Process in Start-Up Sequence)

Figure 2:
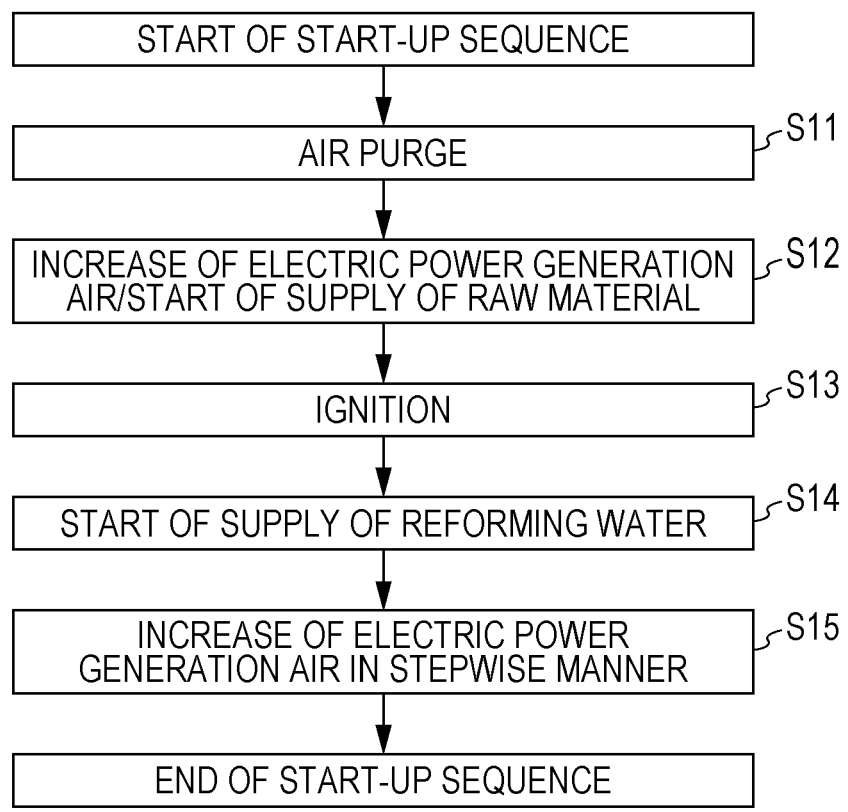
FIG. 2 is a flowchart showing one example of an operation process in a start-up sequence of the SOFC system according to the embodiment of the present disclosure.

Next, with reference to FIG. 2, an operation process in the start-up sequence of the SOFC system 100 will be described. FIG. 2 is a flowchart showing one example of the operation process in the start-up sequence of the SOFC system 100 according to the embodiment of the present disclosure. In addition, the start-up sequence represents a series of steps to be performed in the SOFC system 100 from the state in which the power generation of the cell stack 4 is stopped to the state in which the power generation of the cell stack 4 is performed.

In addition, in the SOFC system 100 according to the embodiment, the start-up sequence is performed by a so-called SR start-up method in which SR is only performed without performing PDX and ATR.

In the start-up sequence, first, in order to exhaust moisture, gases, and the like remaining in the fuel cell module 1, an air purge is performed (Step S11). In particular, the controller 20 controls the electric power generation air supplier 11 to supply the electric power generation air at a predetermined flow rate for a predetermined time (Δt1 in FIG. 3 which will be described later) to the fuel cell module 1. In addition, the controller 20 is connected to a time measuring portion (not shown) measuring an elapsed time and is able to control a supply time (predetermined time Δt1) of the electric power generation air necessary for the air purge based on the measurement result by the time measuring portion.

After the period Δt1 passes, in the SOFC system 100, the flow rate of the electric power generation air is increased, and in addition, the supply of the raw material is started (Step S12). When the flow rate of the electric power generation air is increased, and the supply of the raw material is started, in the SOFC system 100, in accordance with a control instruction from the controller 20, the igniter 8 in the combustion chamber 5 ignites the off-gas discharged from the cells 3 (Step S13). In addition, at the stage described above, since the reforming reaction is not performed in the reformer 6, the off-gas to be ignited by the igniter 8 is formed of the raw material and the electric power generation air.

As the flames are stabilized in the combustion chamber 5, by the heat (such as the combustion heat and the heat of the combustion exhaust gas generated by the combustion) generated in association with the combustion, the temperatures of the members to be heated (such as the cell stack 4, the reformer 6, and the air pre-heating device 7) are increased. Based on the detection result of the reformer temperature detection sensor 19, when the controller 20 judges that the temperature of the reformer 6 reaches a predetermined temperature (T1) or more, the controller 20 controls the water supplier 12 to start the supply of the reforming water to the fuel cell module 1 (Step S14). When the supply of the reforming water is started, the controller 20 controls the electric power generation air supplier 11 to increase the flow rate of the electric power generation air to be supplied to the fuel cell module 1 in a stepwise manner (Step S15).

When a predetermined time passes from the start of the supply of the reforming water, the raw material is reformed by the steam reforming reaction in the reformer 6, and the reformed gas is generated. The reformed gas thus generated is supplied to the anode of the cell 3, and the power generation is performed.

Figure 3:
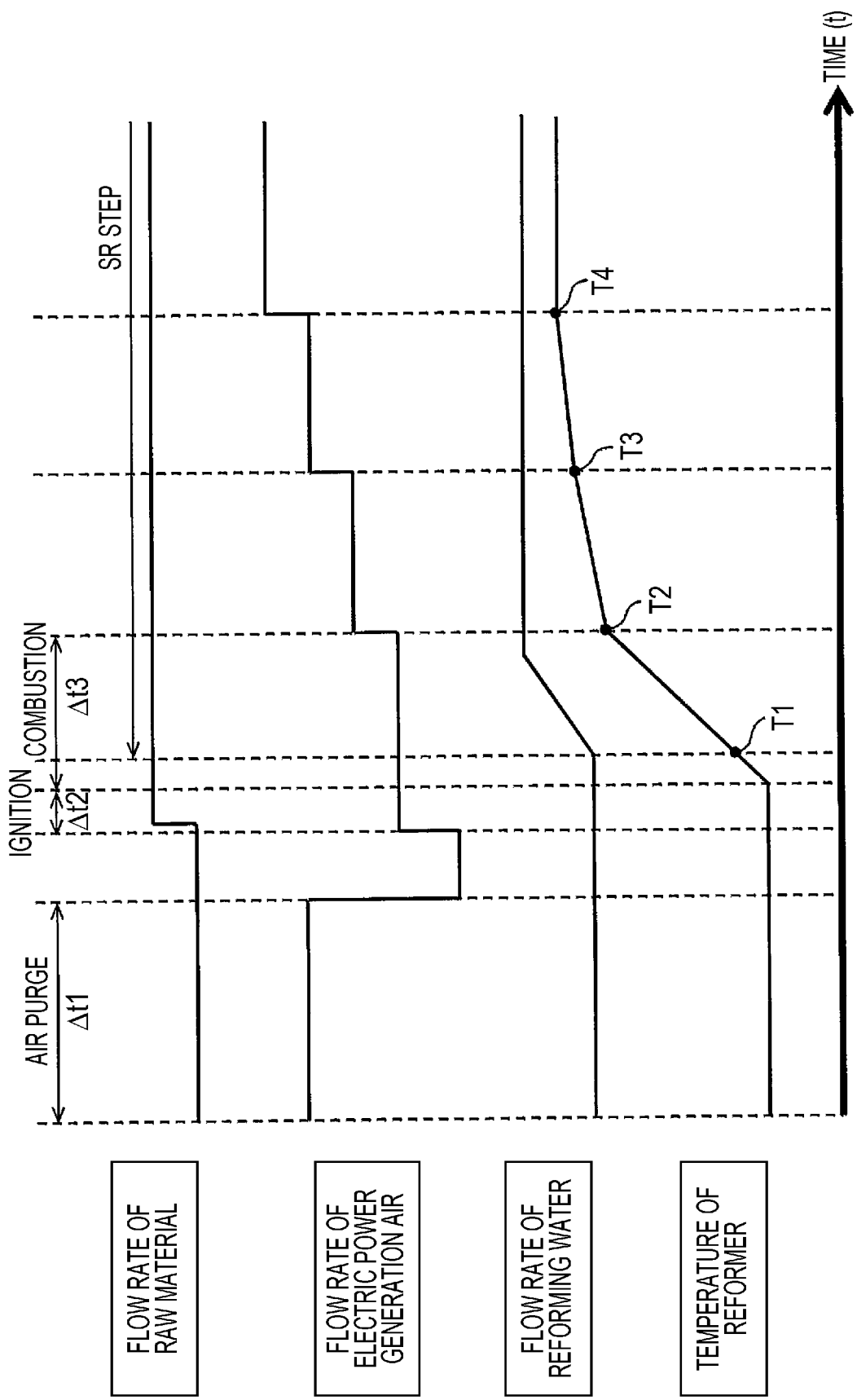
FIG. 3 is a time chart showing one example of a supply timing of each fluid in the start-up sequence of the SOFC system according to the embodiment of the present disclosure.

Next, with reference to FIG. 3 together with the above FIG. 2, details of the operation process in the above start-up sequence of the SOFC system 100 will be described. In particular, the relationship between a supply timing of each fluid (such as the raw material, the electric power generation air, or the reforming water) and the change in temperature of the reformer 6 will be described. FIG. 3 is a time chart showing one example of the supply timing of each fluid in the start-up sequence of the SOFC system 100 according to the embodiment of the present disclosure. In FIG. 3, the horizontal axis represents a time axis, and the changes with time in flow rate of the raw material, the electric power generation air, and the reforming water, and the change with time in temperature of the reformer 6 detected by the reformer temperature detection sensor 19 are shown from the top to the bottom. In addition, in FIG. 3, the changes with time in flow rate of the raw material, the electric power generation air, and the reforming water are each shown by the change in height of a straight line extending along a horizontal axis direction, the position at which the height of the straight line is increased represents the start of the supply of each fluid or the increase of the flow rate thereof, and the position at which the height of the straight line is decreased represents the decrease of the flow rate of each fluid. In FIG. 3, it is to be understood that from the left to the right of the plane, the time passes.

In addition, in FIG. 3, a period from a stage at which the air purge is started to a stage at which the steam reforming reaction (SR) step is performed in the reformer 6 is shown. In this period, a period (Δt1) performing the air purge, a period (Δt2) igniting the off-gas discharged from the cells 3, a period (Δt3) stabilizing the combustion of the off-gas, and a period in which the steam reforming reaction (SR) is performed can be discriminated from each other.

First, in the start-up sequence, as shown in Step S11 of FIG. 2, the air purge is performed in the SOFC system 100. Hence, as shown in FIG. 3, in accordance with the control instruction from the controller 20, the electric power generation air supplier 11 supplies the electric power generation air at a predetermined flow rate to the fuel cell module 1 for the period Δt1. As described above, since the electric power generation air is supplied in the fuel cell module 1, moisture, gases, and the like remaining inside and outside the cells 3 can be exhausted outside for removal.

After the air purge is finished, and before an ignition operation is performed by the igniter 8, the electric power generation air supplier 11 decreases the flow rate of the electric power generation air to a predetermined value in accordance with a control instruction from the controller 20. Subsequently, the controller 20 controls the electric power generation air supplier 11 to increase the flow rate of the electric power generation air and also controls the raw material supplier 10 to start the supply of the raw material (Step S12). Furthermore, the controller 20 controls the igniter 8 to ignite the off-gas discharged from the cells 3 (Step S13).

In addition, as shown in FIG. 3, in the SOFC system 100, strictly speaking, although the electric power generation air supplier 11 increases the flow rate of the electric power generation air at approximately the same time as that of the ignition operation of the igniter 8, the raw material supplier 10 starts the supply of the raw material at a time slightly delayed from the start of the ignition operation of the igniter 8. As described above, Step S12 and Step S13 shown in FIG. 2 may be performed at substantially the same time. Alternatively, after Step S13 is performed, Step S12 may then be performed.

In the combustion chamber 5, when the off-gas discharged from the cells 3 is ignited by the igniter 8, the igniter 8 stops the ignition operation.

In addition, at an initial stage at which the off-gas is ignited, since the flame temperature is low, the flames are in an unstable state. Hence, in the SOFC system 100, in a period from the ignition of the off-gas to the stabilization of the flames, the electric power generation air supplier 11 continuously supplies the electric power generation air at a low flow rate as compared to that of the electric power generation air to be supplied in general power generation.

As described above, the SOFC system 100 is formed so that in the state in which the raw material and the electric power generation air at a low flow rate as compared to that thereof in general power generation are supplied to the fuel cell module 1, the off-gas is ignited by the igniter 8 for combustion. In addition, in this case, the flow rate of the electric power generation air supplied by the electric power generation air supplier 11 is set so as to satisfy the following conditions. That is, the flow rate of the electric power generation air is set so that an air excess ratio ($\lambda$) obtained by dividing the flow rate (air flow rate) of the cathode off-gas discharged to the combustion chamber 5 by a theoretical air flow rate necessary for complete combustion of the anode off-gas in the combustion chamber 5 is 1.0 to 2.0 and preferably 1.2 to 1.6.

Hence, in the SOFC system 100, at the ignition, since a large amount of the electric power generation air is not supplied as the cathode off-gas to the combustion chamber 5, the stability of the ignition to the off-gas by the igniter 8 can be prevented from being disturbed caused by a large amount of the electric power generation air. In addition, after the ignition, in the combustion chamber 5, since the electric power generation air, which contains oxygen necessary for maintaining the combustion, enters the flames by diffusion from the outside, the flame stability can be enhanced, and the generation of carbon monoxide can be suppressed.

When the reformer 6 is heated to the predetermined temperature (T1) by the heat generated in association with the combustion in the combustion chamber 5, the controller 20 controls the water supplier 12 to start the supply of the reforming water. In addition, this predetermined temperature (T1) may be at least a temperature at which water can be evaporated and is a temperature of 100° C. or more. In the SOFC system 100, for example, the predetermined temperature (T1) may be set to 300° C. In addition, when the water supplier 12 supplies a large amount of the reforming water at the same time to the reformer 6, the flames in the combustion chamber 5 may be unstabilized in some cases. Hence, the controller 20 controls the water supplier 12 so as to supply the reforming water while the flow rate thereof is gradually increased. When the reformer 6 is heated to a temperature at which the steam reforming reaction (SR) step can be performed, the raw material is reformed, so that the reformed gas is generated.

In addition, at the initial stage at which the off-gas is ignited, since the combustion temperature is low, the flames in the combustion chamber 5 become unstable. Furthermore, when the supply of the reforming water is started, the flames become more unstable. Hence, in order to maintain the flames and to obtain stable combustion, the air-fuel ratio of the cathode off-gas (air) to the anode off-gas (fuel) relating to the combustion in the combustion chamber 5 is preferably the equivalent ratio or a slightly air rich ratio.

Accordingly, in the SOFC system 100 according to the embodiment, when the supply of the reforming water is started as described above, the flow rate of the electric power generation air thus supplied is set so that the air excess ratio (λ) of the air relating to the combustion is set to 1.0 to 2.0 and preferably 1.2 to 1.6.

As shown in FIG. 3, the temperature of the reformer 6 and the flow rate of each fluid are changed as described below. That is, in the period (Δt1) in which the air purge is performed and a period until the ignition is started, the temperature of the reformer 6 is not substantially changed. In the period (Δt3) from the ignition of the off-gas to the stabilization of the combustion, the temperature of the reformer 6 is rapidly increased.

When the temperature of the reformer 6 reaches the predetermined temperature (T1) or more, the supply of the reforming water is started. In addition, when the supply of the reforming water is started, since the flames in the combustion chamber 5 become unstable, until the flame combustion is stabilized, the flow rate of the electric power generation air is not changed.

Subsequently, when the controller 20 judges that the flames become stable, and that the temperature of the reformer 6 reaches a predetermined temperature (T2) or more, while the flow rate of the raw material is maintained constant, the electric power generation air supplier 11 is controlled so as to increase the flow rate of the electric power generation air. In this case, the flow rate of the electric power generation air is set so that the air excess ratio (λ) of the air relating to the combustion in the combustion chamber 5 is, for example, 1.5 to 3.0. Incidentally, the predetermined temperature (T2) is a temperature at which it can be judged that stable flame combustion is performed in the combustion chamber 5, is a temperature capable of suppressing coking of the hydrocarbon raw material, and may be, for example, set to 560° C. That is, when the stable flame combustion is supposed to be performed, the predetermined temperature (T2) may be regarded as a temperature of the reformer 6, for example, 180 seconds after the supply start of the reforming water and may be obtained in advance by simulation or the like. In addition, information relating to the predetermined temperature (T2) obtained in advance by the simulation or the like may be stored in advance in a memory (not shown) of the controller 20.

Furthermore, when the temperature of the reformer 6 is judged to be increased from the predetermined temperature (T2) to a predetermined temperature (T3) or more, the controller 20 controls the electric power generation air supplier 11 to further increase the flow rate of the electric power generation air. In this case, the flow rate of the electric power generation air is set so that the air excess ratio (λ) of the air relating to the combustion in the combustion chamber 5 is 3.0 to 4.0. In addition, the predetermined temperature (T3) is, for example, a temperature at which the reforming of the raw material is sufficiently performed by SR in the reformer 6 and may be, for example, set to 650° C.

In addition, when the temperature of the reformer 6 is judged to be increased to a predetermined temperature (T4) or more, the controller 20 controls the electric power generation air supplier 11 to increase the flow rate of the electric power generation air to the air flow rate thereof to be supplied in general power generation. The flow rate of the electric power generation air after the increase thereof is set so that the air excess ratio (λ) of the air relating to the combustion in the combustion chamber 5 is, for example, 4.0 to 10.0. In addition, the predetermined temperature (T4) may be set to a temperature higher than the temperature (such as 730° C.) of the reformer 6 in general power generation, and this temperature may also be obtained in advance by simulation or the like and may be stored in advance in a memory (not shown) of the controller 20.

As described above, in the SOFC system 100, in a predetermined period (period until the temperature of the reformer 6 reaches T4 or more) from the supply of the reforming water to the fuel cell module 1 to the stage at which the SR step is performed, the flow rate of the electric power generation air is increased in a stepwise manner.

In addition, as shown in FIG. 3, the SOFC system 100 according to the embodiment is formed so that the flow rate of the electric power generation air supplied at the ignition is increased three times to the flow rate of the electric power generation air necessary for general power generation. However, the number of steps of increasing the flow rate of the electric power generation air is not limited to three, and for example, the number of steps may be two or four or more.

As described above, in the start-up sequence of the SOFC system 100 according to the embodiment, after a large amount of the electric power generation air is supplied for the air purge before the off-gas is ignited, the electric power generation air is continuously supplied at a low flow rate which is set at the ignition, and in addition, after the supply of the raw material is started, and the reforming water is supplied, the flow rate of the electric power generation air is increased in a stepwise manner.

As described above, by performing the air purge before the off-gas is ignited, since moisture and gases remaining in the cells 3 are removed, the ignition stability in the combustion chamber 5 can be enhanced, and the generation of carbon monoxide can also be suppressed. In addition, since the flow rate of the electric power generation air is increased in a stepwise manner, in the SOFC system 100, overheating of the members to be heated can be prevented.

Modified Example 1 of Embodiment (Structure of SOFC System of Modified Example 1)

Figure 4:
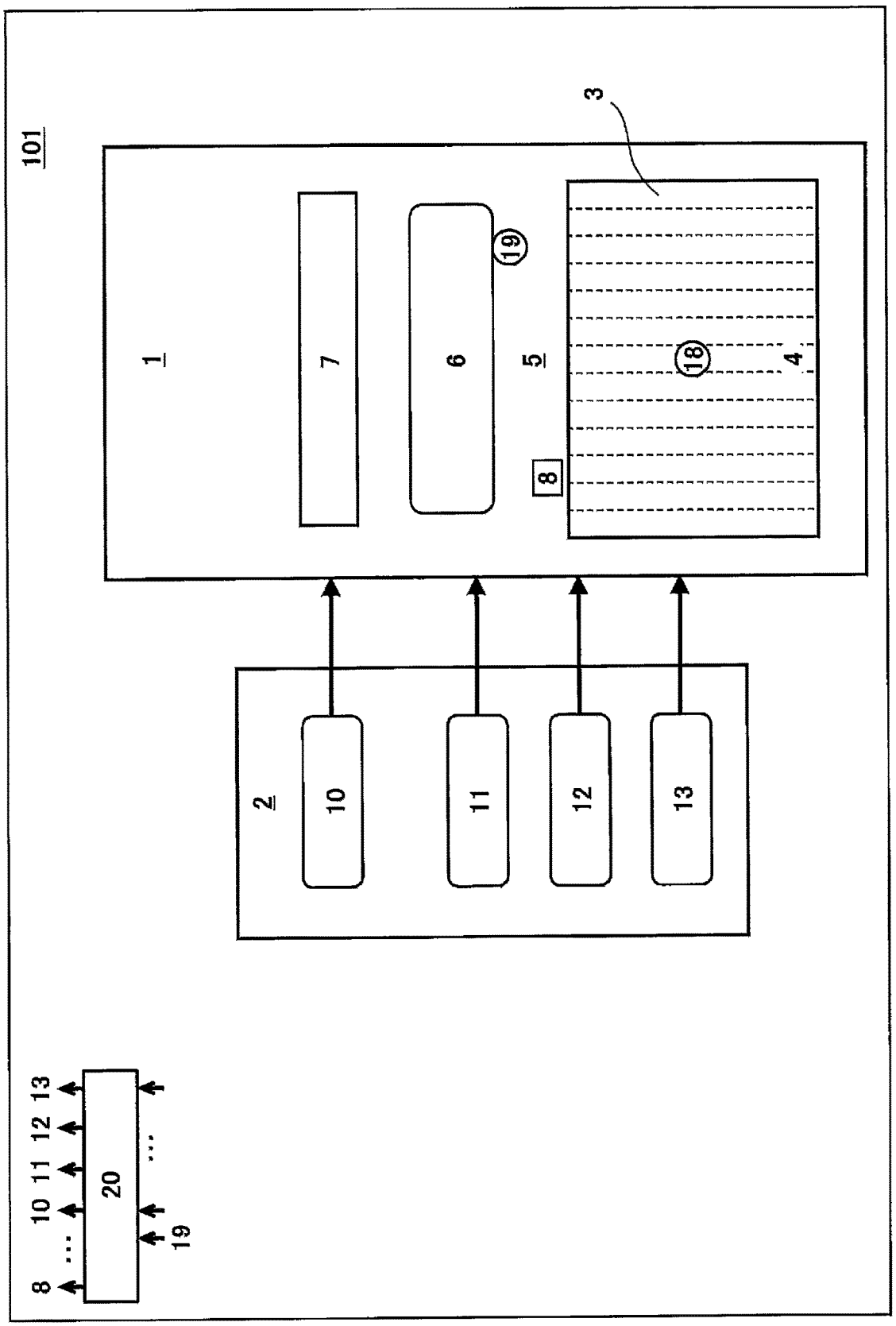
FIG. 4 is a schematic view showing the entire structure of an SOFC system according to Modified Example 1 of the embodiment of the present disclosure.

FIG. 4 is a schematic view showing the entire structure of the SOFC system 101 according to Modified Example 1 of the embodiment of the present disclosure. In addition, in FIG. 4, for convenience of illustration, distribution paths of a raw material, a reformed gas, reforming air, reforming water, and electric power generation air in a fuel cell module 1 are omitted.

As show in FIG. 4, the SOFC system 101 according to Modified Example 1 is formed so that in the structure of the SOFC system 100 according to the embodiment, the sub-device 2 further includes a reforming air supplier 13. Except for that described above, since the SOFC system 101 according to Modified Example 1 has the structure similar to that of the SOFC system 100 according to the embodiment, similar members are designated by the same reference numeral, and description thereof will be omitted.

The reforming air supplier 13 is a supplier to supply to a reformer 6, air (reforming air) to be used for a reforming reaction performed in the reformer 6 in accordance with a control instruction from a controller 20 and may be formed so that the flow rate of the reforming air to be supplied to the reformer 6 is adjustable. In addition, the reforming air supplier 13 may have the structure in which a pressure rise device and a flow rate adjusting valve are provided or the structure in which one of them is provided. Although a constant volume type pump to be driven by a motor is used as the pressure rise device, the pressure rise device is not limited thereto.

In addition, the SOFC system 101 according to Modified Example 1 is formed so that after an ATR step is performed, the raw material is reformed by performing an SR step to generate the reformed gas. Hence, when the reformer 6 generates the reformed gas by SR, a water supplier 12 supplies the reforming water to the reformer 6. On the other hand, when the reformer 6 generates the reformed gas by ATR, the water supplier 12 supplies the reforming water to the reformer 6, and in addition, the reforming air supplier 13 supplies the reforming air to the reformer 6.

(Operation Process in Start-Up Sequence)

Figure 5:
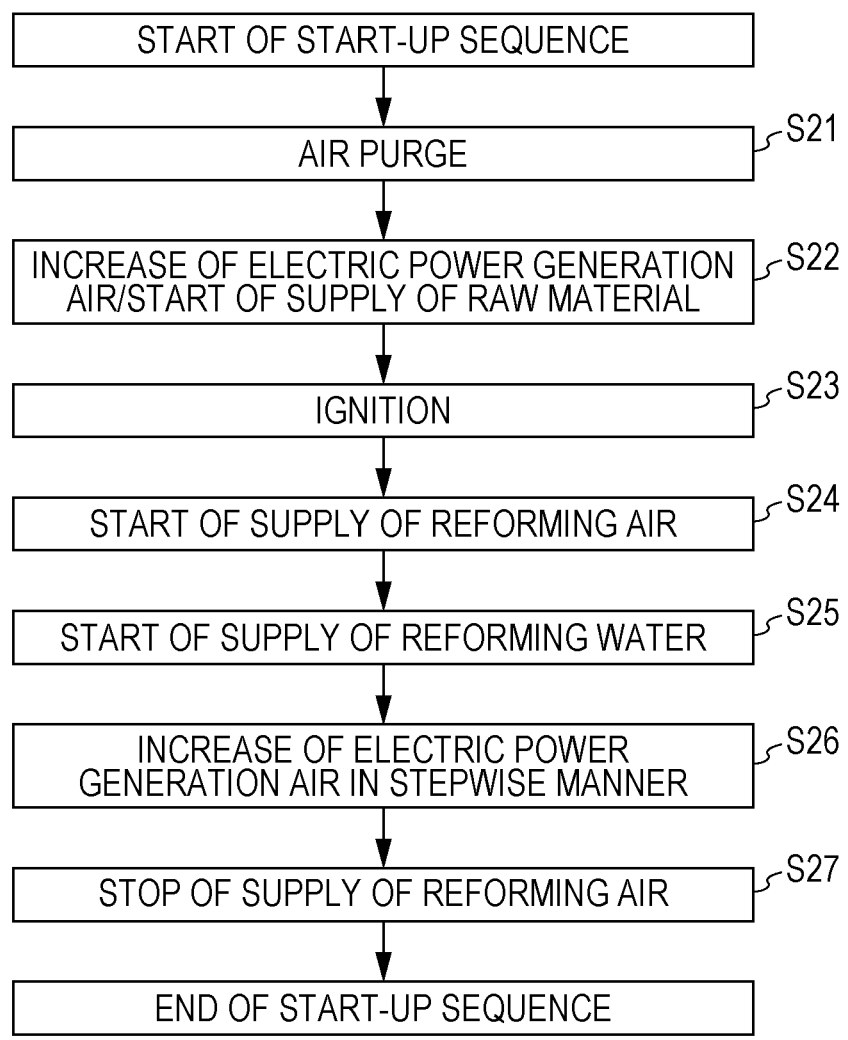
FIG. 5 is a flowchart showing one example of an operation process in a start-up sequence of the SOFC system according to Modified Example 1 of the embodiment of the present disclosure.

Next, with reference to FIG. 5, an operation process in a start-up sequence of the SOFC system 101 according to Modified Example 1 will be described. FIG. 5 is a flowchart showing one example of the operation process in the start-up sequence of the SOFC system 101 according to Modified Example 1 of the embodiment of the present disclosure.

In addition, in the start-up sequence shown in FIG. 5, since a process from Step S21 to Step S23 is similar to that of Steps S11 to Step S13 shown in FIG. 2, description thereof will be omitted.

After an off-gas is ignited in Step S23, based on a detection result of a reformer temperature detection sensor 19, when the temperature of the reformer 6 is judged to be a predetermined temperature (T11) or more, the controller 20 controls the reforming air supplier 13 to start the supply of the reforming air to the fuel cell module 1 (Step S24). Furthermore, the controller 20 controls the water supplier 12 to start the supply of the reforming water to the fuel cell module 1 (Step S25). In addition, the predetermined temperature (T11) may be at least a temperature at which the ATR step can be performed and may be, for example, set to 300° C. In addition, Step S24 and Step S25 are not required to be performed in this order, and those two steps may be simultaneously performed, or Step S24 may be performed after Step S25 is performed.

When the supply of the reforming air and the supply of the reforming water are started, the controller 20 controls an electric power generation air supplier 11 to increase the flow rate of the electric power generation air to be supplied to the fuel cell module 1 in a stepwise manner (Step S26). Subsequently, the controller 20 controls the reforming air supplier 13 to stop the supply of the reforming air to the fuel cell module 1 (Step S27). Accordingly, the reforming reaction performed in the reformer 6 is transferred from the ATR step to the SR step.

Figure 6:
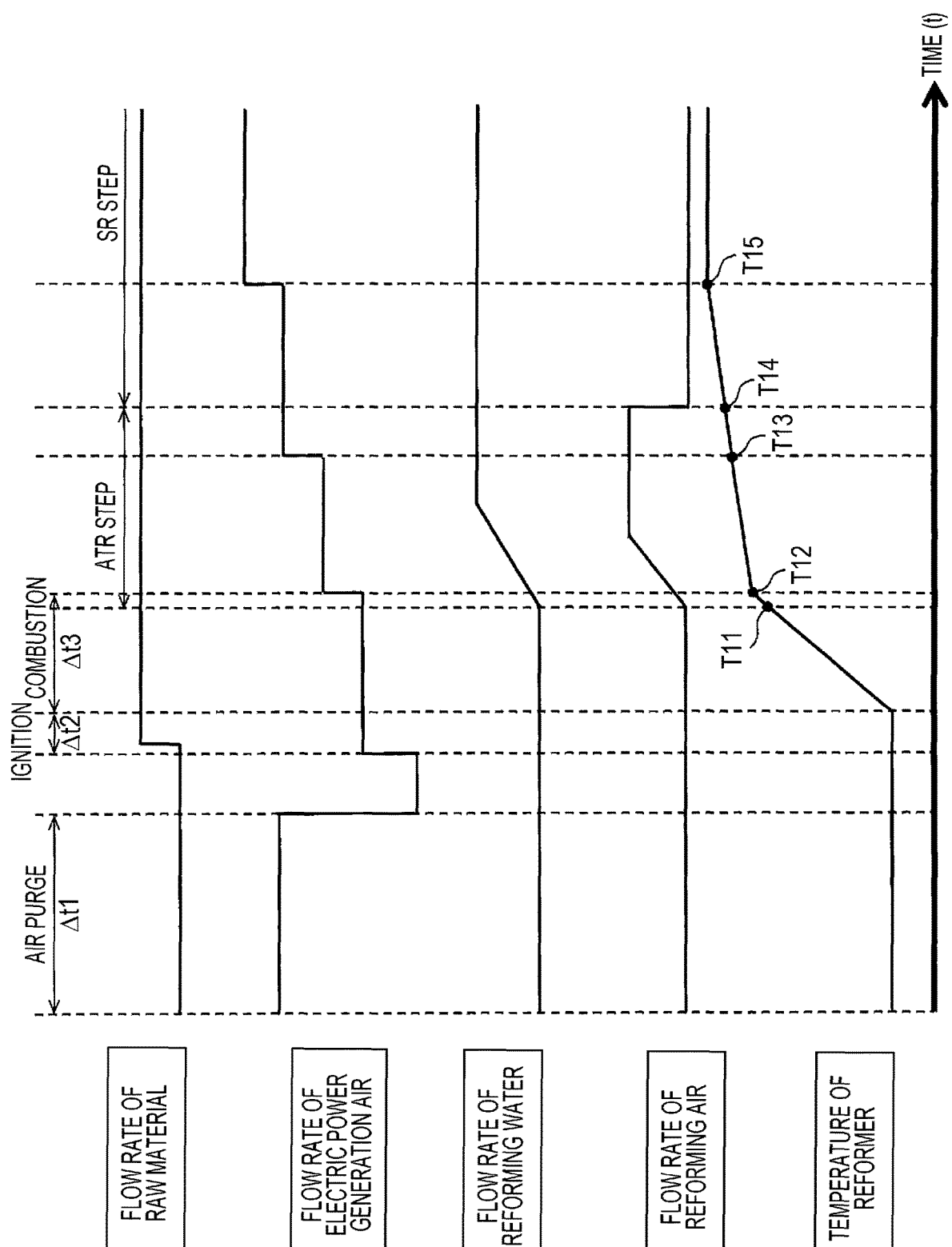
FIG. 6 is a time chart showing one example of a supply timing of each fluid in the start-up sequence of the SOFC system according to Modified Example 1 of the embodiment of the present disclosure.

Next, with reference to FIG. 6 together with the above FIG. 5, details of the operation process in the above start-up sequence of the SOFC system 101 according to Modified Example 1 will be described. In particular, the relationship between a supply timing of each fluid (such as the raw material, the electric power generation air, the reforming water, or the reforming air) and the change in temperature of the reformer 6 will be described. FIG. 6 is a time chart showing one example of the supply timing of each fluid in the start-up sequence of the SOFC system 101 according to Modified Example 1 of the embodiment of the present disclosure. In FIG. 6, the horizontal axis represents a time axis, and the changes with time in flow rate of the raw material, the electric power generation air, the reforming water, and the reforming air, and the change with time in temperature of the reformer 6 detected by the reformer temperature detection sensor 19 are shown from the top to the bottom. In addition, in FIG. 6, the changes with time in flow rate of the raw material, the electric power generation air, the reforming water, and the reforming air are each shown by the change in height of a straight line extending along a horizontal axis direction, the position at which the height of the straight line is increased represents the start of the supply of each fluid or the increase of the flow rate thereof, and the position at which the height of the straight line is decreased represents the decrease of the flow rate of each fluid. In FIG. 6, it is to be understood that from the left to the right of the plane, the time passes.

In addition, in FIG. 6, a period from a stage at which an air purge is started to a stage at which the autothermal (AT) step and the SR step are performed in the reformer 6 in this order is shown. In the period described above, a period ($\Delta t1$) in which an air purge is performed, a period ($\Delta t2$) in which the raw material thus supplied is ignited, a period ($\Delta t3$) in which the combustion between the raw material and the electric power generation air is stabilized, and a period in which the ATR step and the SR step are performed in this order can be discriminated from each other.

First, in the start-up sequence of the SOFC system 101 according to Modified Example 1, as shown in Step S21 of FIG. 5, the air purge is performed. Hence, as shown in FIG. 6, in accordance with a control instruction from the controller 20, the electric power generation air supplier 11 supplies the electric power generation air at a predetermined flow rate to the fuel cell module 1 for the period $\Delta t1$. As described above, since the electric power generation air is supplied in the fuel cell module 1, moisture, gases, and the like remaining inside and outside cells 3 can be exhausted outside for removal. After the air purge is finished, and before an ignition operation is performed by an igniter 8, in accordance with a control instruction from the controller 20, the electric power generation air supplier 11 decreases the flow rate of the electric power generation air to a predetermined value. Subsequently, the controller 20 controls the electric power generation air supplier 11 to increase the flow rate of the electric power generation air and also controls a raw material supplier 10 to start the supply of the raw material (Step S22). Furthermore, the controller 20 controls the igniter 8 to ignite an off-gas discharged from the cells 3 (Step S23).

In addition, as shown in FIG. 6, In the SOFC system 101 according to Modified Example 1, strictly speaking, although the electric power generation air supplier 11 increases the flow rate of the electric power generation air at approximately the same time as that of the ignition operation of the igniter 8, the raw material supplier 10 starts the supply of the raw material at a time slightly delayed from the start of the ignition operation of the igniter 8. As described above, Step S22 and Step S23 shown in FIG. 5 may be performed at substantially the same time. In addition, after Step S23 is performed, Step S22 may then be performed.

When the off-gas discharged from the cells 3 is ignited by the igniter 8 in a combustion chamber 5, the igniter 8 stops the ignition operation.

In addition, at an initial stage at which the off-gas is ignited, since the flame temperature is low, flames are in an unstable state. Hence, in the SOFC system 101 according to Modified Example 1, a period from the ignition of the off-gas to the stabilization of the flames, the electric power generation air supplier 11 supplies the electric power generation air at a low flow rate as compared to that of the electric power generation air to be supplied in general power generation.

As described above, the SOFC system 101 according to Modified Example 1 is formed so that in the state in which the raw material and the electric power generation air at a low flow rate as compared to that thereof in general power generation are supplied to the fuel cell module 1, the off-gas is ignited by the igniter 8 for combustion. In addition, the air flow rate of the electric power generation air to be supplied in this case is set as is the case of the SOFC system 100 according to the embodiment so that the air excess ratio ($\lambda$) of the air relating to the combustion in the combustion chamber 5 is 1.0 to 2.0 and preferably 1.2 to 1.6.

Hence, in the SOFC system 101 according to Modified Example 1, at the ignition, since a large amount of the electric power generation air is not supplied to the combustion chamber 5, the stability of the ignition to the off-gas by the igniter 8 can be prevented from being disturbed by a large amount of the electric power generation air. In addition, after the ignition, in the combustion chamber 5, since the electric power generation air, which contains oxygen necessary for maintaining the combustion, enters the flames by diffusion from the outside, the flame stability can be enhanced, and the generation of carbon monoxide can be suppressed.

When the reformer 6 is heated to the predetermined temperature (T11) by heat generated in association with the combustion in the combustion chamber 5, the controller 20 controls the water supplier 12 to start the supply of the reforming water and also controls the reforming air supplier 13 to start the supply of the reforming air. In addition, this predetermined temperature (T11) may be at least a temperature at which the ATR step can be performed and may be set, for example, to 450° C. In addition, when the water supplier 12 supplies a large amount of the reforming water at the same time to the reformer 6, and/or when the reforming air supplier 13 supplies a large amount of the reforming air at the same time to the reformer 6, the flames in the combustion chamber 5 may be unstabilized in some cases. Hence, the controller 20 controls the water supplier 12 so as to supply the reforming water while the flow rate thereof is gradually increased. In addition, the controller 20 controls the reforming air supplier 13 so as to supply the reforming air while the flow rate thereof is gradually increased. When the reforming water and the reforming air are supplied as described above, ATR is performed in the reformer 6. In addition, in order to prevent the degradation of the reforming catalyst filled in the reformer 6 caused by carbon precipitation, the flow rate of the reforming air may be reduced to a minimum required level for the ATR step.

As show in FIG. 6, the temperature of the reformer 6 and the flow rate of each fluid are changed as described below. That is, in the period ($\Delta t1$) in which the air purge is performed and a period until the ignition is started, the temperature of the reformer 6 is not substantially changed. In the period ($\Delta t3$) from the ignition of the off-gas to the stabilization of the combustion, the temperature of the reformer 6 is rapidly increased. When the temperature of the reformer 6 reaches the predetermined temperature (T11) (such as 450° C.) or more, the supply of the reforming water and the supply of the reforming air are started. In addition, when the supply of the reforming water and the supply of the reforming air are started, since the flames in the combustion chamber 5 become unstable, until the flame combustion is stabilized, the flow rate of the electric power generation air is not changed.

Subsequently, when the controller 20 judges that the flames are stabilized and the temperature of the reformer 6 reaches a predetermined temperature (T12) or more, while the flow rate of the raw material is maintained constant, the electric power generation air supplier 11 is controlled to increase the flow rate of the electric power generation air. In this step, the flow rate of the electric power generation air is set so that the air excess ratio ($\lambda$) of the air relating to the combustion in the combustion chamber 5 is 1.5 to 3.0. In addition, the predetermined temperature (T12) is a temperature at which it can be judged that stable flame combustion is performed in the combustion chamber 5, is a temperature capable of suppressing coking of the hydrocarbon raw material, and may be, for example, set to 560° C. That is, when the stable flame combustion is supposed to be performed, the predetermined temperature (T12) is regarded as a temperature of the reformer 6, for example, 180 seconds after the supply start of the reforming water and may be obtained in advance by simulation or the like. In addition, information relating to the predetermined temperature (T12) obtained in advance by the simulation or the like may be stored in advance in a memory (not shown) of the controller 20.

Furthermore, when the temperature of the reformer 6 is judged to be increased from the predetermined temperature (T12) to a predetermined temperature (T13) or more, the controller 20 controls the electric power generation air supplier 11 to further increase the flow rate of the electric power generation air. In this step, the flow rate of the electric power generation air is set so that the air excess ratio ($\lambda$) of the air relating to the combustion in the combustion chamber 5 is 3.0 to 4.0. In addition, the predetermined temperature T13 is, for example, a temperature at which the reforming of the raw material is sufficiently performed by ATR in the reformer 6 and may be, for example, set to 600° C.

In addition, when the temperature of the reformer 6 is judged to be increased to a predetermined temperature (T14) or more, the controller 20 controls the reforming air supplier 13 to stop the supply of the reforming air. In addition, the predetermined temperature T14 is a temperature obtained when a predetermined time passes from the supply start of the reforming water and the reforming air and may be, for example, set to 650° C. This predetermined temperature (T14) is a temperature of the reformer 6 at which a reformed gas necessary for the power generation can be generated only by the SR step and may be obtained in advance by simulation or the like. In addition, information relating to the predetermined temperature (T14) obtained in advance by the simulation or the like may be stored in advance in a memory (not shown) of the controller 20.

In addition, when the temperature of the reformer 6 is judged to be increased to a predetermined temperature (T15) (such as 730° C.) or more, the controller 20 controls the electric power generation air supplier 11 to increase the flow rate of the electric power generation air to an air flow rate thereof to be supplied in general power generation. The flow rate of the electric power generation air thus increased is set so that, for example, the air excess ratio ($\lambda$) of the air relating to the combustion in the combustion chamber 5 is 4.0 to 10.0. In addition, the predetermined temperature (T15) is a temperature higher than the temperature of the reformer 6 in general power generation and may be obtained in advance by simulation or the like so as to be stored in advance in a memory (not shown) of the controller 20.

As described above, in the SOFC system 101 according to Modified Example 1, in a predetermined period (period until the temperature of the reformer 6 reaches T15 or more) from the supply of the reforming water to the fuel cell module 1 to the stage at which the SR step is performed, the flow rate of the electric power generation air is increased in a stepwise manner.

In addition, the SOFC system 101 according to Modified Example 1 is formed so that as shown in FIG. 6, the flow rate of the electric power generation air supplied at the ignition is increased three times in a stepwise manner to the flow rate of the electric power generation air necessary in general power generation. However, the number of steps of increasing the flow rate of the electric power generation air is not limited to three times as described above and may be two times or may be four times or more.

As described above, the start-up sequence of the SOFC system 101 according to Modified Example 1 is formed so that after the air purge is performed by supplying a large amount of the electric power generation air before the off-gas is ignited, the electric power generation air is continuously supplied at a low flow rate which is set at the ignition, and the supply of the raw material is started, and in addition, after the supply of the reforming water is started, the flow rate of the electric power generation air is increased in a stepwise manner.

As described above, since the air purge is performed before the off-gas is ignited, moisture and gases remaining in the cells 3 are removed, so that the flame stability in the combustion chamber 5 can be enhanced, and the generation of carbon monoxide can also be suppressed. In addition, since the flow rate of the electric power generation air is increased in a stepwise manner, in the SOFC system 101 according to Modified Example 1, overheating of the members to be heated can be prevented.

In addition, the SOFC system 101 according to Modified Example 1 is formed so that in the start-up sequence, in the reformer 6, the reformed gas is generated from the raw material, first, by the ATR step and, then, by the SR step. However, the reforming reactions performed in the reformer 6 are not limited thereto. In the reformer 6, the reforming reaction may be performed by a PDX step, the ATR step, and the SR step in this order so as to generate the reformed gas from the raw material.

Modified Example 2 of Embodiment

Hereinafter, as the SOFC system 101 according to Modified Example 2 of the embodiment of the present disclosure, an SOFC system in which reforming reactions are performed by a PDX step, an ATR step, and an SR step in this order so as to generate a reformed gas from a raw material will be described.

In addition, since the SOFC system 101 according to Modified Example 2 has the structure similar to that of the SOFC system 101 according to Modified Example 1, identical members are designated by the same reference numeral, and description thereof is omitted.

In addition, the SOFC system 101 according to Modified Example 2 is formed so that the reforming reactions are performed by a PDX reaction, an ATR reaction, and an SR reaction in this order to generate the reformed gas from the raw material by reforming thereof. Hence, when a reformer 6 generates the reformed gas by SR, a water supplier 12 supplies reforming water to the reformer 6. In addition, when the reformer 6 generates the reformed gas by ATR, the water supplier 12 supplies the reforming water to the reformer 6, and simultaneously, a reforming air supplier 13 supplies reforming air to the reformer 6. Furthermore, when the reformer 6 generates the reformed gas by PDX, the reforming air supplier 13 supplies the reforming air to the reformer 6.

Figure 7:
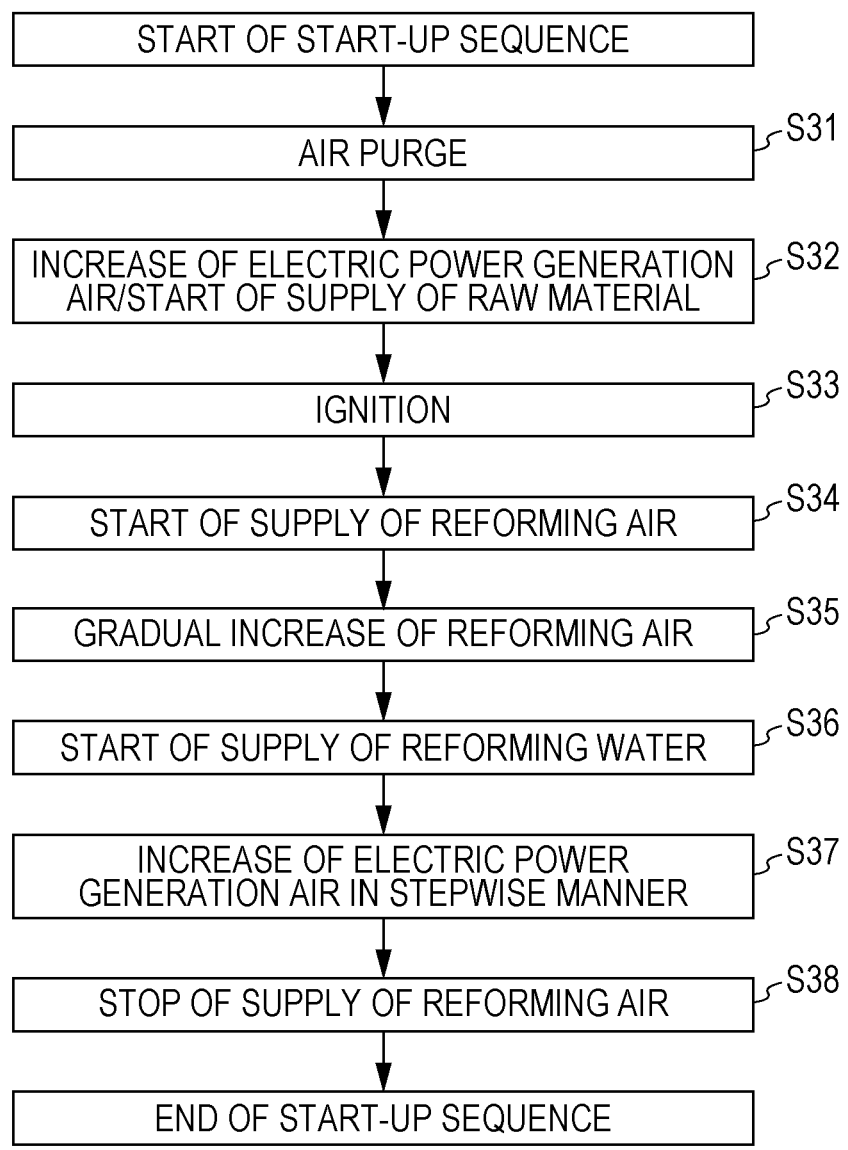
FIG. 7 is a flowchart showing one example of an operation process in a start-up sequence of an SOFC system according to Modified Example 2 of the embodiment of the present disclosure.

With reference to FIG. 7, an operation process in a start-up sequence of the SOFC system 101 according to Modified Example 2 will be described. FIG. 7 is a flowchart showing on example of the operation process in the start-up sequence of the SOFC system 101 according to Modified Example 2 of the embodiment of the present disclosure.

In the start-up sequence, first, in order to remove moisture, gases, and the like remaining in a fuel cell module 1, an air purge is performed (Step S31). In particular, a controller 20 controls an electric power generation air supplier 11 to supply electric power generation air at a predetermined flow rate to the fuel cell module 1 for a predetermined time ($\Delta t1$ in FIG. 8 which will be described later). Furthermore, the controller 20 controls the reforming air supplier 13 to supply the reforming air to the fuel cell module 1 for the predetermined time ($\Delta t1$ in FIG. 8 which will be described below).

In addition, the controller 20 is connected to a time measuring portion (not shown) measuring an elapsed time and is able to control a supply time (predetermined time $\Delta t1$) of the electric power generation air necessary for the air purge based on the measurement result by the time measuring portion.

After the air purge is performed in Step S31, in the SOFC system 101 according to Modified Example 2, the flow rate of the electric power generation air is increased, and at the same time, the supply of the raw material is started (Step S32). When the flow rate of the electric power generation air is increased, and the supply of the raw material is started, in the SOFC system 101 according to Modified Example 2, in accordance with a control instruction from the controller 20, an igniter 8 in a combustion chamber 5 ignites an off-gas discharged from cells 3 (Step S33).

In addition, in the SOFC system 101 according to Modified Example 2, as is the SOFC system 100 according to the embodiment described above, Step S32 and Step S33 may be simultaneously performed, or after Step S33 is first performed, Step S32 may then be performed.

After the ignition is performed in Step S33, in the SOFC system 101 according to Modified Example 2, the supply of the reforming air is started (Step S 34). That is, when the off-gas is ignited in the Step S33, the controller 20 controls the reforming air supplier 13 to start the supply of the reforming air.

As flames are stabilized in the combustion chamber 5, by heat generated in association with the combustion, the temperatures of members to be heated (such as a cell stack 4, the reformer 6, and an air pre-heating device 7) are also increased. Hence, when the temperature of the reformer 6 is increased to a temperature at which the PDX step can be performed, by the use of the reforming air thus supplied, the PDX step is performed.

In addition, when the controller 20 judges based on a detection result of a reformer temperature detection sensor 19 that the temperature of the reformer 6 is increased to a predetermined temperature (T21) or more, the controller 20 controls the reforming air supplier 13 to gradually increase the flow rate of the reforming air to be supplied to the fuel cell module 1 (Step S35). Furthermore, the controller 20 controls the water supplier 12 to start the supply of the reforming water to the fuel cell module 1 (Step S36). Accordingly, the reforming reaction performed in the reformer 6 is transferred from the PDX step to the ATR step.

In addition, the predetermined temperature (T21) may be at least a temperature at which the ATR step can be performed and may be, for example, set to 450° C. In addition, Step S35 and Step S36 are not required to be performed in this order, and those two steps may be simultaneously performed, or after Step S36 is performed, Step S35 may then be performed.

When the supply of the reforming air and the supply of the reforming water are started, the controller 20 controls the electric power generation air supplier 11 to increase the flow rate of the electric power generation air to be supplied to the fuel cell module 1 in a stepwise manner (Step S37). Subsequently, the controller 20 controls the reforming air supplier 13 to stop the supply of the reforming air to the fuel cell module 1 (Step S38). Accordingly, the reforming reaction performed in the reformer 6 is transferred from the ATR step to the SR step.

Figure 8:
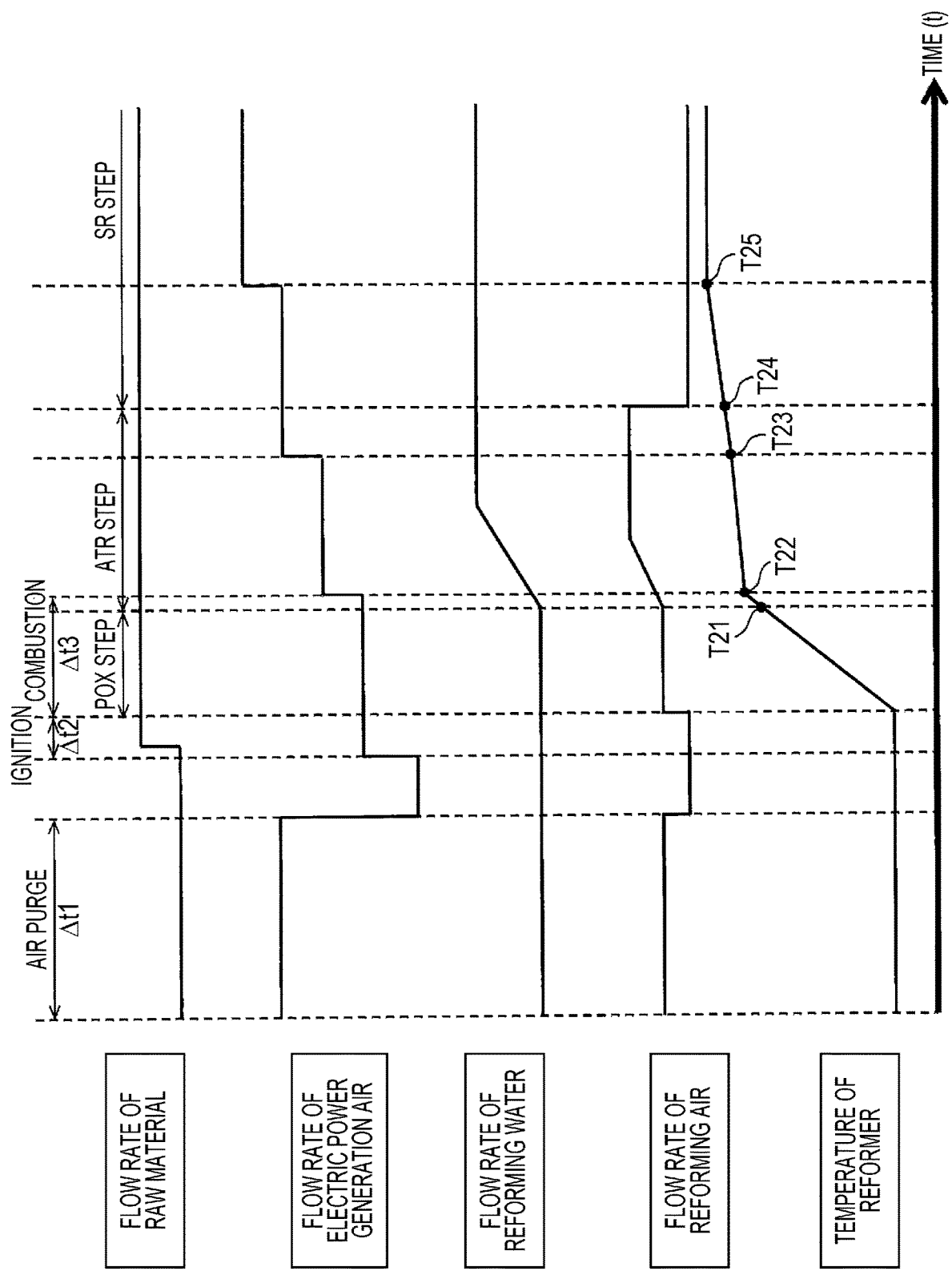
FIG. 8 is a time chart showing one example of a supply timing of each fluid in the start-up sequence of the SOFC system according to Modified Example 2 of the embodiment of the present disclosure.

Next, with reference to FIG. 8 together with FIG. 7, details of the operation process in the start-up sequence of the SOFC system 101 according to Modified Example 2 will be described. In particular, the relationship between a supply timing of each fluid (such as the raw material, the electric power generation air, the reforming water, or the reforming air) and the change in temperature of the reformer 6 will be described. FIG. 8 is a time chart showing one example of the supply timing of each fluid in the start-up sequence of the SOFC system 101 according to Modified Example 2 of the embodiment of the present disclosure. In FIG. 8, the horizontal axis represents a time axis, and the changes with time in flow rate of the raw material, the electric power generation air, the reforming water, and the reforming air, and the change with time in temperature of the reformer 6 detected by the reformer temperature detection sensor 19 are shown from the top to the bottom. In addition, in FIG. 8, the changes with time in flow rate of the raw material, the electric power generation air, the reforming water, and the reforming air are each shown by the change in height of a straight line extending along a horizontal axis direction, the position at which the height of the straight line is increased represents the start of the supply of each fluid or the increase of the flow rate thereof, and the position at which the height of the straight line is decreased represents the decrease of the flow rate of each fluid. In FIG. 8, it is to be understood that from the left to the right of the plane, the time passes.

In addition, in FIG. 8, a period from a stage at which the air purge is started and to a stage at which the PDX step, the ATR step, and the SR step are performed in the reformer 6 in this order is shown. In the period described above, a period (Δt1) in which the air purge is performed, a period (Δt2) in which the off-gas discharged from the cells 3 is ignited, a period (Δt3) in which the combustion of the off-gas is stabilized, and a period in which the PDX step, the ATR step, and the SR step are sequentially performed can be discriminated from each other.

First, in the start-up sequence, in the SOFC system 101 according to Modified Example 2, as shown in Step S31 of FIG. 7, the air purge is performed. Hence, as shown in FIG. 8, in accordance with a control instruction from the controller 20, the electric power generation air supplier 11 supplies the electric power generation air at a predetermined flow rate to the fuel cell module 1 for the period Δt1. Furthermore, in accordance with a control instruction from the controller 20, the reforming air supplier 13 supplies the reforming air at a predetermined flow rate to the fuel cell module 1 for the period Δt1. As described above, since the electric power generation air and the reforming air are supplied in the fuel cell module 1, moisture, gases, and the like remaining inside and outside the cells 3 can be exhausted outside for removal.

After the air purge is finished, before an ignition operation is performed by the igniter 8, in accordance with a control instruction from the controller 20, the electric power generation air supplier 11 decreases the flow rate of the electric power generation air to a predetermined value. Furthermore, in accordance with a control instruction from the controller 20, the reforming air supplier 13 stops the supply of the reforming air. Subsequently, the controller 20 controls the electric power generation air supplier 11 to increase the flow rate of the electric power generation air and also controls a raw material supplier 10 to start the supply of the raw material (Step S32). Furthermore, the controller 20 controls the igniter 8 to ignite the off-gas discharged from the cells 3 (Step S33).

When the off-gas discharged from the cells 3 is ignited by the igniter 8 in the combustion chamber 5, the igniter 8 stops the ignition operation.

In addition, at an initial stage at which the off-gas is ignited, sine the flame temperature is low, the flames are in an unstable state. Hence, in the SOFC system 101 according to Modified Example 2, a period from the ignition of the off-gas to the stabilization of the flames, the electric power generation air supplier 11 continuously supplies the electric power generation air at a low flow rate as compared to that of the electric power generation air to be supplied in general power generation.

As described above, the SOFC system 101 according to Modified Example 2 is formed so that in the state in which the raw material and the electric power generation air at a low flow rate as compared to that thereof to be supplied in general power generation are supplied to the fuel cell module 1, the off-gas is ignited by the igniter 8 for combustion. In addition, the flow rate of the electric power generation air to be supplied in this step is set so that the air excess ratio (λ) of the air relating to the combustion in the combustion chamber 5 is 1.0 to 2.0 and preferably 1.2 to 1.6.

Hence, in the SOFC system 101 according to Modified Example 2, at the ignition, since a large amount of the electric power generation air is not supplied to the combustion chamber 5 as a cathode off-gas, the stability of the ignition of the off-gas by the igniter 8 can be prevented from being disturbed by a large amount of the electric power generation air. In addition, after the ignition, in the combustion chamber 5, since the electric power generation air, which contains oxygen necessary for maintaining the combustion, enters the flames by diffusion from the outside, the flame stability can be enhanced, and the generation of carbon monoxide can be suppressed.

In addition, in order to stably ignite the raw material by the igniter 8, in the SOFC system 101 according to Modified Example 2, the reforming air supplier 13 is formed so as to supply the reforming air after the ignition.

When the reformer 6 is heated by heat of a combustion exhaust gas generated by the combustion of the raw material and the electric power generation air and combustion heat in the combustion chamber 5 so as to be able to perform PDX, the reformed gas is generated from the raw material by PDX in the reformer 6. Furthermore, when the reformer 6 is heated to the predetermined temperature (T21), the controller 20 controls the reforming air supplier 13 to increase the flow rate of the reforming air (Step S35) and also controls the water supplier 12 to start the supply of the reforming water (Step S36).

In addition, this predetermined temperature (T21) may be at least a temperature at which the ATR step can be performed and may be, for example, set to 450° C. In addition, when the water supplier 12 supplies a large amount of the reforming water at the same time to the reformer 6, and/or when the reforming air supplier 13 supplies a large amount of the reforming air at the same time to the reformer 6, the flames in the combustion chamber 5 may be unstabilized in some cases. Hence, the controller 20 controls the water supplier 12 so as to supply the reforming water while the flow rate thereof is gradually increased. In addition, the controller 20 controls the reforming air supplier 13 so as to supply the reforming air while the flow rate thereof is gradually increased. When the supply of the reforming water is started, and the flow rate of the reforming air is increased as described above, ATR is performed in the reformer 6. In addition, in order to prevent the degradation of the reforming catalyst filled in the reformer 6 caused by carbon precipitation, the flow rate of the reforming air may be reduced to a minimum required level for the ATR step.

As show in FIG. 8, the temperature of the reformer 6 and the flow rate of each fluid are changed as described below. That is, in the period (Δt1) in which the air purge is performed and a period until the ignition is started, the temperature of the reformer 6 is not substantially changed. In the period (Δt3) from the ignition of the off-gas to the stabilization of the combustion, the temperature of the reformer 6 is rapidly increased. In addition, after the off-gas is ignited, the controller 20 controls the reforming air supplier 13 to start the supply of the reforming air.

When the temperature of the reformer 6 reaches the predetermined temperature (T21) or more, the supply of the reforming water is started. Furthermore, the flow rate of the reforming air is gradually increased. In addition, when the supply of the reforming water and the supply of the reforming air are started, since the flames in the combustion chamber 5 become unstable, the flow rate of the electric power generation air is not changed until the flame combustion is stabilized.

Subsequently, when the controller 20 judges that the flames are stabilized, and that the temperature of the reformer 6 reaches a predetermined temperature (T22) or more, the controller 20 controls the electric power generation air supplier 11 to increase the flow rate of the electric power generation air while the flow rate of the raw material is maintained constant. In this step, the flow rate of the electric power generation air is set so that the air excess ratio (λ) of the air relating to the combustion in the combustion chamber 5 is, for example, 1.5 to 3.0. In addition, the predetermined temperature (T22) is a temperature at which it can be judged that stable flame combustion is performed in the combustion chamber 5, is a temperature capable of suppressing coking of the hydrocarbon raw material, and may be, for example, set to 560° C. This is, when the stable flame combustion is supposed to be performed, this predetermined temperature (T22) may be regarded as a temperature of the reformer 6, for example, 180 seconds after the supply start of the reforming water and may be obtained in advance by simulation or the like. In addition, information relating to the predetermined temperature (T22) obtained in advance by the simulation or the like may be stored in advance in a memory (not shown) of the controller 20.

In addition, when the temperature of the reformer 6 is judged to be increased from the predetermined temperature (T22) to a predetermined temperature (T23) or more, the controller 20 controls the electric power generation air supplier 11 to further increase the flow rate of the electric power generation air. In this step, the flow rate of the electric power generation air is set so that the air excess ratio (λ) of the air relating to the combustion in the combustion chamber 5 is 3.0 to 4.0. In addition, the predetermined temperature (T23) is, for example, a temperature at which the reforming of the raw material can be sufficiently performed by ATR in the reformer 6 and may be, for example, set to 600° C.

In addition, when the temperature of the reformer 6 is judged to be increased to a predetermined temperature (T24) or more, the controller 20 controls the reforming air supplier 13 to stop the supply of the reforming air. In addition, the predetermined temperature T24 is a temperature obtained when a predetermined period of time passes after the start of the supply of the reforming water and the reforming air and may be, for example, set to 650° C. This predetermined temperature (T24) is a temperature of the reformer 6 at which a reformed gas necessary for the power generation can be generated only by the SR step and may be obtained in advance by simulation or the like. In addition, information relating to the predetermined temperature (T24) obtained in advance by the simulation or the like may be stored in advance in a memory (not shown) of the controller 20.

In addition, when the temperature of the reformer 6 is judged to be increased to a predetermined temperature (T25) or more, the controller 20 controls the electric power generation air supplier 11 to increase the flow rate of the electric power generation air to an air flow rate thereof to be supplied in general power generation. The flow rate of the electric power generation air thus increased is set so that, for example, the air excess ratio (λ) of the air relating to the combustion in the combustion chamber 5 is 4.0 to 10.0. In addition, the predetermined temperature (T25) is a temperature higher than the temperature of the reformer 6 in general power generation and may be set, for example, to 730° C. This temperature may also be obtained in advance by simulation or the like and may be stored in advance in a memory (not shown) of the controller 20.

As described above, in the SOFC system 101 according to Modified Example 2, in a predetermined period (in the period in which the temperature of the reformer 6 is increased to T25 or more) from the supply of the reforming water to the fuel cell module 1 to the stage at which the SR step is performed, the flow rate of the electric power generation air is increased in a stepwise manner.

In addition, as shown in FIG. 8, the SOFC system 101 according to Modified Example 2 is formed so that the flow rate of the electric power generation air supplied at the ignition is increased three times in a stepwise manner to the flow rate of the electric power generation air necessary for general power generation. However, the number of steps of increasing the flow rate of the electric power generation air in a stepwise manner is not limited to three times and may be two times or four times or more.

As described above, in the start-up sequence of the SOFC system 101 according to Modified Example 2, after the air purge is performed by supplying a large amount of the electric power generation air before the off-gas is ignited, the electric power generation air is continuously supplied at a low flow rate which is set at the ignition, and at the same time, the supply of the raw material is started, and in addition, after the reforming water is supplied, the flow rate of the electric power generation air is increased in a stepwise manner.

As described above, by the air purge performed before the off-gas is ignited, since moisture and gases remaining in the cells 3 are removed, the ignition stability in the combustion chamber 5 can be enhanced, and the generation of carbon monoxide can also be suppressed. In addition, since the flow rate of the electric power generation air is increased in a stepwise manner, in the SOFC system 101 according to Modified Example 2, the members to be heated can be prevented from being overheated.

In particular, in the above Modified Example 2, in the start-up sequence, the reforming reactions in the reformer 6 are performed by the PDX step, the ATR step, and the SR step in this order. In this case, since PDX is an exothermic reaction, compared to the structure according to the embodiment in which the SR step is only performed, the cell stack 4 and the reformer 6 may be probably overheated. Hence, the structure in which the overheating can be prevented by increasing the flow rate of the electric power generation air in a stepwise manner is advantageous.

In addition, the temperatures represented by T1 to T4, T11 to T15, and T21 to T25 described above are examples in which the reforming reaction in the reformer 6 is performed only by SR, by ATR and SR in this order, and by PDX, ATR, and SR in this order, respectively, and are not limited thereto.

From the above description, many improvements and other embodiments of the present disclosure are apparent to a person skilled in the art. Hence, the above description is to be understood as examples and is provided to suggest the best mode of carrying out the present disclosure to a person skilled in the art. The structures and/or the functions described above may be substantially changed and/or modified without departing from the spirit of the present disclosure.

The SOFC system according to the present disclosure may be widely used for a household fuel cell system, an industrial fuel cell system, various power source supply systems, and the like, each of which ignites a raw material at a start-up, heats a reformer and the like by heat of a generated combustion exhaust gas, and performs a reforming reaction.

What is claimed is:

1. A fuel cell system comprising:
a cell stack for generating an electric power by a reaction between a fuel gas and electric power generation air;
a reformer for generating the fuel gas by reforming a raw material and for supplying the fuel gas to the cell stack;
a raw material supplier for supplying the raw material to the reformer;
a water supplier for supplying reforming water to the reformer;
an air supplier for supplying the electric power generation air to the cell stack;
a combustion chamber in which an off-gas discharged from the cell stack is combusted and which heats the cell stack and the reformer by heat generated in association with the combustion;
an igniter for igniting the off-gas in the combustion chamber; and
a controller including a processor and a memory storing a control instruction, wherein the control instruction, when executed by the processor,
in a start-up sequence, causes the controller to control the fuel cell system such that the raw material supplier supplies the raw material to the reformer, the air supplier supplies the electric power generation air to the cell stack, the igniter ignites the off-gas discharged from the cell stack, and after the ignition, the water supplier starts the supply of the reforming water to the reformer, and
after the supply of the reforming water is started by the water supplier, causes the controller to further control the air supplier to increase a flow rate of the electric power generation air in a stepwise manner.

2. The fuel cell system according to claim 1,
wherein when the reformer reaches a predetermined temperature after the off-gas is ignited, the control instruction, when executed by the processor causes the controller to control the water supplier to start the supply of the reforming water to the reformer.

3. The fuel cell system according to claim 2,
wherein when the supply of the reforming water is started by the water supplier, the control instruction, when executed by the processor causes the controller to control the flow rate of the electric power generation air by the air supplier and the flow rate of the raw material by the raw material supplier so that an air excess ratio of the air relating to the combustion in the combustion chamber is 1.0 to 2.0.

4. The fuel cell system according to claim 1, wherein the control instruction, when executed by the processor causes the controller to control the air supplier to increase the flow rate of the electric power generation air when a temperature of the reformer reaches predetermined temperatures.

* * * * *